United States Patent
Wei et al.

(10) Patent No.: US 11,069,100 B2
(45) Date of Patent: Jul. 20, 2021

(54) INTELLIGENT INTERACTIVE INTERFACE

(71) Applicant: NORTHWEST INSTRUMENT INC., Budd Lake, NJ (US)

(72) Inventors: Yufei Wei, Shanghai (CN); Xin Shi, Shanghai (CN); David Xing, Budd Lake, NJ (US)

(73) Assignee: NORTHWEST INSTRUMENT INC., Budd Lake, NJ (US)

( * ) Notice: Subject to any disclaimer, the term of this patent is extended or adjusted under 35 U.S.C. 154(b) by 0 days.

(21) Appl. No.: 15/547,939

(22) PCT Filed: Jan. 8, 2016

(86) PCT No.: PCT/CN2016/070454
§ 371 (c)(1),
(2) Date: Aug. 1, 2017

(87) PCT Pub. No.: WO2017/117796
PCT Pub. Date: Jul. 13, 2017

(65) Prior Publication Data
US 2018/0025516 A1    Jan. 25, 2018

(30) Foreign Application Priority Data
Jan. 7, 2016 (CN) .......................... 201610008470.1

(51) Int. Cl.
*G06T 11/20* (2006.01)
*G05B 19/418* (2006.01)
(Continued)

(52) U.S. Cl.
CPC .......... *G06T 11/206* (2013.01); *G01C 15/002* (2013.01); *G01S 17/86* (2020.01);
(Continued)

(58) Field of Classification Search
None
See application file for complete search history.

(56) References Cited

U.S. PATENT DOCUMENTS

2007/0179645 A1    8/2007  Nixon et al.
2009/0210071 A1*   8/2009  Agrusa .............. G05B 23/0267
                                              700/9
(Continued)

FOREIGN PATENT DOCUMENTS

CN    101350153 A    1/2009
CN    103777204 A    5/2014
(Continued)

OTHER PUBLICATIONS

International Search Report for Application No. PCT/CN2016/070454, dated Oct. 11, 2016.

*Primary Examiner* — Yi Wang
(74) *Attorney, Agent, or Firm* — Anova Law Group, PLLC

(57) ABSTRACT

The present disclosure discloses an intelligent interactive interface, comprising: an interface underlayer drawn from trajectory formed by measurement; a plurality of identifications disposed on the interface underlayer, each of the identifications corresponds to an external device, information of the external device is uploaded in real time, displayed on the interface underlayer and can be stored on a server, and a mapping relationship is established between the information of the external device and the corresponding identification of respective external device; a terminal apparatus is connected to the external device and displays the interface underlayer, identifications and control and/or exchange information with the external device; wherein the information of the external device is displayed in real time on the terminal apparatus through the identifications, the identifications can be added or deleted in real time. The present (Continued)

disclosure implements functional interactions such as controlling, monitoring an external device by a terminal apparatus. The present disclosure also implements various functions such as curve line measurement, dotting, identification description, synthesis of a measurement drawing and a real scene, remote real-time monitoring, etc.

18 Claims, 1 Drawing Sheet

(51) Int. Cl.
| | |
|---|---|
| G05B 23/02 | (2006.01) |
| G01C 15/00 | (2006.01) |
| G06F 3/048 | (2013.01) |
| G01S 17/86 | (2020.01) |
| G01S 17/89 | (2020.01) |
| G06F 3/14 | (2006.01) |
| G06T 11/60 | (2006.01) |
| G01B 3/12 | (2006.01) |

(52) U.S. Cl.
CPC ........ *G01S 17/89* (2013.01); *G05B 19/41885* (2013.01); *G05B 23/0216* (2013.01); *G06F 3/048* (2013.01); *G06F 3/1462* (2013.01); *G06T 11/60* (2013.01); *G01B 3/12* (2013.01); *G06T 2200/24* (2013.01)

(56) References Cited

U.S. PATENT DOCUMENTS

| | | | |
|---|---|---|---|
| 2012/0195491 A1* | 8/2012 | Zhang | G05D 1/0227 382/153 |
| 2012/0319895 A1* | 12/2012 | Bruchiel | H01Q 1/125 342/357.36 |
| 2014/0267717 A1 | 9/2014 | Pitzer et al. | |
| 2015/0123995 A1* | 5/2015 | Zavodny | G06T 11/60 345/630 |
| 2016/0005229 A1* | 1/2016 | Lee | G06F 3/0488 345/419 |
| 2016/0205123 A1* | 7/2016 | Almurayh | H04L 63/1425 726/23 |
| 2017/0024917 A1* | 1/2017 | Deitrich | G06T 11/60 |
| 2017/0108236 A1* | 4/2017 | Guan | H05B 47/19 |
| 2018/0075643 A1* | 3/2018 | Sequeira | G01C 21/206 |

FOREIGN PATENT DOCUMENTS

| | | |
|---|---|---|
| CN | 104501803 A | 4/2015 |
| CN | 104634222 A | 5/2015 |
| CN | 204514232 U | 7/2015 |
| EP | 2824525 A1 | 1/2015 |
| GB | 2513238 A | 10/2014 |
| WO | WO-2014/103989 A1 | 7/2014 |

* cited by examiner

INTELLIGENT INTERACTIVE INTERFACE

TECHNICAL FIELD

The present disclosure relates to the field of interactive control, and more particularly to an intelligent interactive interface.

BACKGROUND

Currently, using a ranging device to measure and plan routes and areas is required almost in all aspects of people's life and work, such as in the field of construction, road engineering, transportation, pipeline laying, garden landscape, etc. Commonly used ranging devices are laser rangefinder and ranging wheel.

Various ranging device structures have been disclosed in prior art. For example, CN201420143325.0 discloses an inner and outer optical path switching system of a laser rangefinder for realizing switch of the laser rangefinder in two working status of an inner optical path and an outer optical path. The switching system includes a laser source, a half transmitting half-reflecting mirror, a reflecting mirror, a shading plate, a motor and a motor-driven circuit. The shading plate is fixed on a rotating shaft of the motor and is driven by the motor to select to be at a first shading position or a second shading position. The laser emitted by the laser source is divided into two light waves of ranging light and inner reference light through the half-transmitting half-reflecting mirror. The ranging light penetrates through the half-transmitting half-reflecting mirror and forms the outer optical path. The inner reference light is reflected by the reflecting mirror and forms the inner optical path. For another example, CN201410152898.4 discloses a single optical path laser ranging system for accurate determination of the distance of measured object. The ranging system comprises a microprocessor, a signal generator, a laser generator, and a photodiode and frequency mixer. The microprocessor controls the signal generator to output two groups of pulse signals. One group of pulse signals are respectively sent to the laser generator and the photodiodes, to form a photoelectric mixed signal used by the outer optical path. Another group of pulse signals are sent to the frequency mixer for frequency mixing to generate a reference signal used by ranging. The microprocessor synchronously samples the photoelectric mixed signal and the reference signal, and calculates the voltage values of both signals to accurately obtain a measured distance value.

However, it can be seen, from the technical solutions disclosed above, that conventional ranging device can only perform straight line ranging, none of them is capable of achieving the following functions: 1. measuring both a curve line route and a straight line distance, generating measurement drawings, directly designating line marking and dotting; 2. adding remark and description text, images, voice and video to the identification point; 3. performing synthetic imaging on ranging routes and real scene photos to enhance the visualizability; 4. monitoring and controlling the status of an intelligent device on a map. These issues greatly limit the application of ranging device.

SUMMARY

The object of the present disclosure is to overcome the disadvantages of the prior art and provide an intelligent interactive interface to achieve various functions such as curve line measurement, dotting, identification description, synthesis of measurement drawing and real scene, remote real-time monitoring, etc.

To achieve the above object, the present disclosure provides the following technical solution: an intelligent interactive interface, comprising: an interface underlayer drawn from trajectory formed by measurement; a plurality of identifications disposed on the interface underlayer, each of the identifications corresponds to an external device, information of the external device is uploaded in real time, displayed on the interface underlayer and capable of being stored on a server, and a mapping relationship being established between the information of the external device and the corresponding identification of respective external device; a terminal apparatus to connect to the external device and display the interface underlayer, the identifications, and control the external device and/or exchange information with the external device; wherein the information of the external device is displayed on the terminal apparatus, in real time, through the identifications and the identifications can be added or deleted in real time.

Preferably, the interface underlayer is an electronic map formed by performing synthetic imaging on measurement drawing generated by ranging and a real scene photo; or the interface underlayer is directly formed by the measurement drawing generated by ranging.

Preferably, the measurement drawing is formed in real time in a measurement process.

Preferably, trigonometric functions calculation is made according to the measured distance data and direction data to obtain a plurality of location points and connecting the plurality of location points forms the measurement drawing.

Preferably, when a cursor of the terminal apparatus is paused on the identification or clicking the identification point, the information of the corresponding external device is displayed on the terminal apparatus.

Preferably, trigonometric functions calculation formulas of the current location point are:

$$X=OX+\sin(R)*L$$

$$Y=OY+\cos(R)*L$$

wherein X represents the X-axis coordinate of the current location point, Y represents the Y-axis coordinate of the current location point, OX is the X-axis coordinate of the last point, OY is the Y-axis coordinate of the last point, R is the directional angle value when obtaining the distance data, L is a difference value of the distances between the current location point and the last point.

Preferably, in the measurement process, the identification is marked at the location on the generated measurement drawing corresponding to the external device and identification information is added in the server for the identification.

Preferably, the identification information comprises any one of picture, text, voice, and video.

Preferably, in the ranging process, the measurement is paused or any one of the previous identifications is re-selected as a new starting point for measurement.

Preferably, any one of existing generated measurement drawings is opened and the measurement is continued from the end of last measurement.

Preferably, the intelligent interactive interface gives out alarm information when the information of the external device is abnormal.

Preferably, in the process of synthesizing the measurement drawing and the real scene photo of a measured target, the perspective angle, the perspective distance and direction of the measurement drawing are adjusted to make the measurement drawing aligned and attached to the measured target.

Preferably, the information of the external device comprises the inherent property and working data of the external device.

Preferably, in the measurement process, the due north direction is found as the initial measurement direction by rotating an azimuth sensor disposed on the measurement apparatus.

The beneficial effects of the present disclosure are:

1. The present disclosure can measure the distance of various routes such as straight line, curve line and polygonal line.

2. The present disclosure can generate measurement drawings in real time according to actual measurement, and can direct the line marking, dotting according to the measurement drawing, or add identification descriptions to identification points in form of, but not limited to, picture, text, video or voice.

3. The present disclosure can perform synthetic imaging on a measurement drawing and a real scene photo to enhance the visualizability.

4. The present disclosure can perform remote real-time monitor and control of an electronic map and thus greatly improve its working efficiency.

DETAILED DESCRIPTION

A clear and complete description of the technical solution of the embodiments of the present disclosure will be made below in conjunction with the accompanying drawings of the present disclosure.

Figure 1:
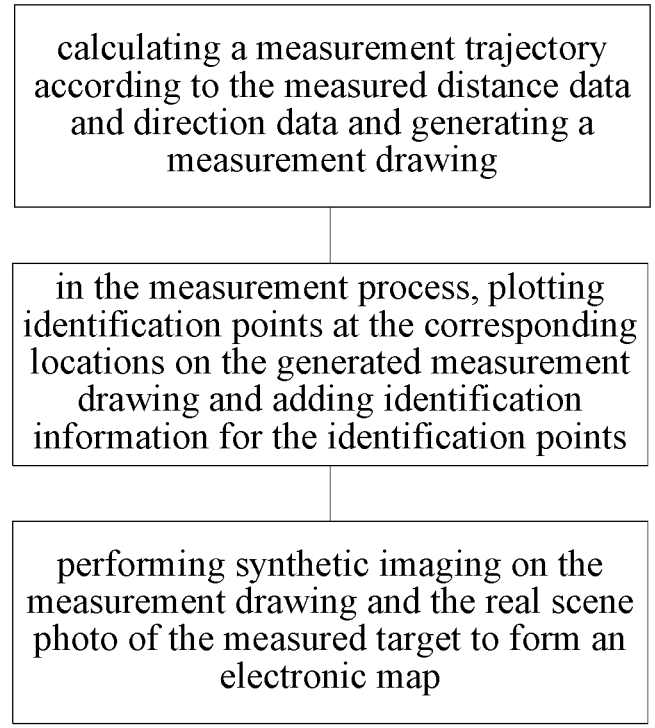
FIG. 1 is a schematic diagram of a forming process of an underlayer of an intelligent interactive interface of the present disclosure.
Figure 2:
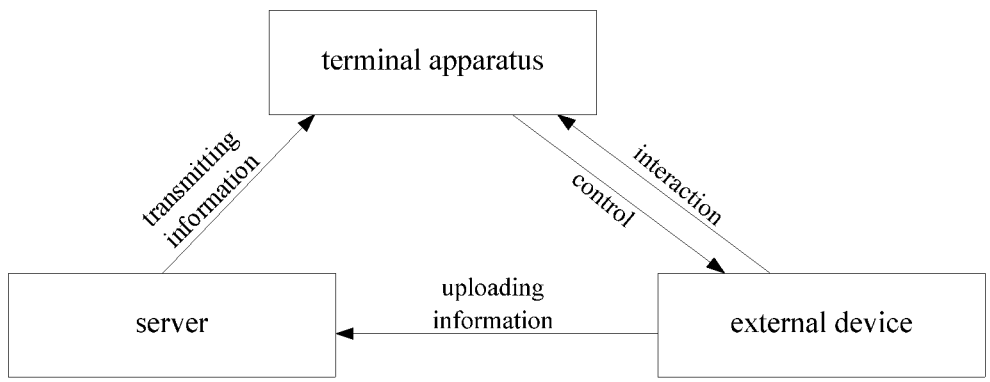
FIG. 2 is a principal schematic diagram of an intelligent interactive interface of the present disclosure.

Referring to FIG. 1 and FIG. 2, an intelligent interactive interface is disclosed by the present disclosure and the intelligent interactive interface enables a terminal apparatus to realize functional interactions such as controlling, monitoring an external device. The external device may be a home appliance or an industrial equipment. The intelligent interactive interface mainly comprises an interface underlayer, a plurality of identifications and a terminal apparatus. The interface underlayer is drawn from trajectory formed by measurement, and preferably is an electronic map formed by performing synthetic imaging on a measurement drawing generated by ranging and a real scene photo. Thereby an electronic map is generated which implements both straight line measurement and curve line measurement, and also has many functions such as dotting, identification description; meanwhile, by wireless connecting the electronic map with an external device, the electronic map can have the function of real-time remote monitoring, greatly improving the working efficiency of intelligent ranging. It is noteworthy that, in the measurement process, the due north direction is found as the initial measurement direction by rotating an azimuth sensor disposed on the measurement apparatus.

The measurement drawing is generated by the measurement trajectory which is calculated according to the measured distance data and direction data. In particular, the distance data is measured by the corresponding ranging device. The ranging device may be a measurement device such as rangefinder, ranging wheel, total station instrument. The ranging device collects distance data as well as direction data, and transmits the data to the terminal apparatus through wireless transmission. Of course, parts of the data may also be collected by the terminal apparatus, such as collecting direction data by a gyroscope built in cellphone. The terminal apparatus decodes the received data according to internal protocol, calculates and displays the data after unit conversion. The operations of decoding, calculating and unit conversion herein may use well-known, commonly used methods of decoding and calculation and will no longer be discussed in detail.

If selecting the ranging wheel as the ranging device, the ranging device may also be used for measurement of irregular routes such as curve line, polygonal line. The ranging wheel continuously rotates, and the measured distance data is uploaded via Bluetooth to the terminal apparatus. The terminal apparatus receives the distance data from the ranging wheel, and meanwhile continuously obtains the current direction data of the ranging wheel. The direction data may be obtained through an angle sensor, e.g. sensors such as electronic gyroscope, accelerometer. The angle sensor may be connected to the terminal apparatus via Bluetooth or directly disposed inside the terminal apparatus.

After receiving the distance data and the direction data, the terminal apparatus will perform trigonometric functions calculation, based on these two data, to obtain a moving vector of the ranging wheel as well as a plurality of current location points. Connecting these location points will form the measurement trajectory and generate the corresponding measurement drawing at the same time. The measurement drawing herein is formed in the ranging process, i.e., in real time. It is not necessary to draw after the ranging process is finished. The terminal apparatus in the present disclosure may be devices such as cellphone, tablet computer, computer.

In this embodiment, the trigonometric functions calculation formulas for the current location points are as follows:

$$X=OX+\sin(R)*L$$

$$Y=OY+\cos(R)*L$$

wherein, x represents the X-axis coordinate of the current location point, Y represents the Y-axis coordinate of the current location point, OX is the X-axis coordinate of last point, OY is the Y-axis coordinate of last point, R is the directional angle value when obtaining the distance value, L is the distance difference value of the current location point and the last point, (X, Y) is the calculated location of the current location point.

Then the measurement drawing and the real scene photo of the measured target are synthesized to form the interface underlayer, i.e., an electronic map, which can improve the visualizability of the measurement trajectory. The specific synthesis process is as follows: take a real scene photo of the measured target; then measure the measured target using the ranging device of the present disclosure to obtain the measurement trajectory; and generate a corresponding measurement drawing or directly use an already obtained measurement drawing; overlap and synthesize this measurement trajectory and the real scene photo. In the synthesis process, parameters such as the perspective angle, perspective distance, direction of the trajectory are adjusted to make the trajectory aligned and attached to the measured target. Of course, the interface underlayer may also be directly formed by the measurement drawing which is formed by surveying and mapping without synthesizing with a real scene photo.

In the measurement process, when it is required to record the location of the external device, an identification may be added to the current location of the generated measurement drawing. Each identification corresponds to an external device at the current location. If it is further required to add corresponding identification information to the identification, then this identification is selected for which to add an identification information. The identification information is mainly the property information of the external device.

The external device is connected to the terminal apparatus in a wired or wireless way. Interactive control of the external device may be implemented by the terminal apparatus. The property information and working data of the external device is uploaded and stored in a server and displayed through the interface underlayer. That is, a one-to-one mapping relationship between the information of the external device (including the property information and working data) and the external device is established. As such, when a cursor of the terminal apparatus pauses on or clicks the identification, the information of the corresponding external device is displayed on the terminal apparatus. The identification as well as the identification information corresponding to the identification on the measurement drawing can be edited, moved or deleted. Generally speaking, the terminal apparatus is connected to the external device and is used to display the interface underlayer, identification and control and/or exchange information with the external device.

The identification information herein is not limited to the format of text, picture, video or voice and the identification and information is uploaded in real time and stored in the internal database of the terminal apparatus for later viewing and use at any time. Thus the added identification information can be newly added, or can be read directly from the database for use. For instance, the added picture can be newly taken photo or can also be selected from the existing album of the terminal apparatus. The newly added identification point and identification information will also be stored in the database in real time for convenient call.

When the information (i.e., the identification information herein) of the external device is abnormal, especially the working data, the intelligent interactive interface of the present disclosure will give out alarm information and the alarm information is given out in form of voice or light flickering through the terminal apparatus.

Under network environment, the identification point and its corresponding identification information can both synchronized to a cloud server for permanent storage and on-demand distribution. As such, it is ensured that the identification data is not prone to loss, and can be called at any time conveniently.

In addition, the present disclosure may also pause the measurement in the measurement process, and continue the measurement after the location of the ranging device is adjusted, which can control the ranging process very well. In practice, the pause function is implemented by a pause/continue button disposed on the ranging device or terminal apparatus. When the measurement is paused, any one of the previous identifications may also be re-selected as a new starting point for measurement. Any one of existing generated measurement drawings may also be opened and the measurement is continued from the end of last measurement, or any one of previous identifications is re-selected as a new starting point for measurement. Controlling the ranging process according to the user requirement is thus accomplished, greatly improving the flexibility of the ranging process.

Technical contents and technical features of the present disclosure have been disclosed above. However, those skilled in the art may make various replacements and modifications without departing from the spirit of the present disclosure based on the teachings of the present disclosure. Therefore, the scope of the present disclosure should not be limited to the contents disclosed by the embodiments, but should include various replacements and modifications without departing from the present disclosure, and covered by the claims of the present patent application.

What is claimed is:

1. A method for a terminal apparatus to interact with an external device, comprising:
   generating and updating a measurement drawing by performing a measurement using a ranging device real time in a measurement process, the ranging device being connected to the terminal apparatus and sending the measurement to the terminal apparatus;
   displaying an interface underlayer on the terminal apparatus, the interface underlayer including the measurement drawing having direction information and distance information;
   obtaining, by the terminal apparatus, a digital medium object corresponding to an external device by at least one of: recording, by the terminal apparatus, the digital medium object in real time and selecting the digital medium object from an internal database of the terminal apparatus, the digital medium object including one or more of: a picture, a video, a text, and an audio;
   marking, using the digital medium object in the measurement process, the identification of the external device on the interface underlayer at an identification point indicating a current location of the ranging device in the measurement drawing, the identification point corresponding to a current location of the external device;
   connecting the terminal apparatus with the external device to exchange information;
   establishing, by the terminal apparatus, a mapping relationship between the external device and the identification corresponding to the external device marked on the interface underlayer;
   receiving, from the external device by the terminal apparatus, property information of the external device;
   displaying the property information of the external device on the measurement drawing of the interface underlayer associated with the identification point corresponding to the external device; and
   sending a control command to the external device to control an operation of the external device according to the measurement drawing.

2. The method according to claim 1, further comprising:
   forming the interface underlayer by performing image synthesis of the measurement drawing and a real scene photo to form an electronic map.

3. The method according to claim 2, further comprising:
   calculating a plurality of location points and connecting the plurality of location points to form the measurement drawing.

4. The method according to claim 3, further comprising:
   calculating the plurality of current location points using trigonometric formulas:

$$X = OX + \sin(R) * L$$

$Y=OY+\cos(R)*L$ wherein X is an x-axis coordinate of a current location point, Y is a y-axis coordinate of the current location point, OX is the x-axis coordinate of a last point, OY is the y-axis coordinate of the last point, R is a directional angle value when obtaining a distance data, L is a difference value of the distances between the current location point and the last point.

5. The method according to claim 2, further comprising: adjusting one of a perspective angle, a perspective distance and a direction of the measurement drawing to make the measurement drawing aligned with the real scene photo.

6. The method according to claim 1, further comprising: during the measurement using the ranging device, pausing the measurement, and re-starting the measurement by selecting one or more previous identifications as a new starting point.

7. The method according to claim 1, further comprising: opening an existing generated measurement drawing and continuing the measurement from an end of the existing generated measurement drawing.

8. The method according to claim 1, further comprising: outputting alarm information when the information of the external device is abnormal.

9. The method according to claim 1, wherein the information of the external device comprises an inherent property and operating data of the external device.

10. The method according to claim 1, further comprising: finding a due north direction as an initial measurement direction by rotating an azimuth sensor disposed on the ranging device during the measurement.

11. The method according to claim 1, wherein the external device is a home appliance.

12. The method according to claim 1, wherein displaying the information of the external device on the interface underlayer comprises displaying the information of the external device in response to a user interaction with the identification corresponding to the external device, the user interaction including pausing a curser or clicking on the identification.

13. The method according to claim 1, further comprising: updating the identification corresponding to the external device in real time.

14. The method according to claim 1, further comprising: synchronizing and uploading the identification point and the corresponding information of the external device to a server for storage and on-demand distribution.

15. The method according to claim 1, wherein the digital medium object includes one or more of a picture and a video.

16. A terminal apparatus, comprising a memory storing computer-executable instructions and a processor, the processor configured to:
generate and update a measurement drawing by performing a measurement using a ranging device real time in a measurement process, the ranging device being connected to the terminal apparatus and sending the measurement to the terminal apparatus;
display an interface underlayer including the measurement drawing;
obtain a digital medium object corresponding to a home appliance by at least one of:
recording, by the terminal apparatus, the digital medium object in real time and selecting the digital medium object from an internal database of the terminal apparatus, the digital medium object including one or more of: a picture, a video, a text, and an audio;
mark, using the digital medium object in the measurement process, the identification of the home appliance on the interface underlayer at an identification point indicating a current location of the ranging device in the measurement drawing, the identification point corresponding to a current location of the home appliance;
connect to the home appliance to exchange information;
establish a mapping relationship between the home appliance and the identification corresponding to the home appliance marked on the interface underlayer;
receive, from the home appliance, a digital medium object including one or more of a picture, a video, a text, and an audio providing identification and property information of the home appliance;
display the digital medium object including one or more of an image, a video, a text, and an audio on the interface underlayer on the measurement drawing of the interface underlayer associated with the identification point corresponding to the current location of the home appliance; and
send a control command to the home appliance to control an operation of the home appliance according to the measurement drawing.

17. The terminal apparatus according to claim 16, wherein the processor is further configured to:
form the interface underlayer by performing image synthesis of the measurement drawing and a real scene photo to form an electronic map.

18. The terminal apparatus according to claim 16, wherein the processor is further configured to:
generate the measurement drawing by performing a measurement using a ranging device.

* * * * *